United States Patent [19]

Mazumdar

[11] 4,367,841
[45] Jan. 11, 1983

[54] THERMOPLASTIC CARRYING BAG WITH BINARY POLYOLEFIN RESIN BLEND

[75] Inventor: Ranjit Mazumdar, Fairport, N.Y.

[73] Assignee: Mobil Oil Corporation, New York, N.Y.

[21] Appl. No.: 208,091

[22] Filed: Nov. 18, 1980

[51] Int. Cl.³ .................... B65D 33/00; B32B 27/08
[52] U.S. Cl. .................... 229/54 R; 525/240; 428/349; 428/35
[58] Field of Search .............. 525/240; 428/500, 517, 428/347, 349, 516, 35, 335; 229/54 R

[56] References Cited

U.S. PATENT DOCUMENTS

| | | |
|---|---|---|
| 3,176,052 | 3/1965 | Peticolas . |
| 3,509,116 | 4/1970 | Cote et al. . |
| 3,694,524 | 9/1972 | Tinger et al. .............. 525/240 |
| 4,075,290 | 2/1978 | Denzel et al. . |
| 4,147,827 | 4/1979 | Breidt et al. . |
| 4,165,832 | 8/1979 | Kuklies ..................... 229/54 R |

FOREIGN PATENT DOCUMENTS

| | | |
|---|---|---|
| 7906246 | 2/1980 | Netherlands . |
| 827363 | 2/1960 | United Kingdom ........ 525/240 |
| 1035887 | 7/1966 | United Kingdom . |

Primary Examiner—George F. Lesmes
Assistant Examiner—E. Rollins Buffalow
Attorney, Agent, or Firm—Charles A. Huggett; James F. Powers, Jr.; James P. O'Sullivan, Sr.

[57] ABSTRACT

Blended polyolefin resins containing linear low density polyethylene copolymers (LLDPE) are disclosed for making seamless-wall handled strap bags from thin tubular monolayer film consisting essentially of a homogeneous binary blend of resins. The improved resin blend system employed in this invention contains a predominant amount of highly-branched low density polyethylene structure. A minor amount of LLDPE constitutes the other resinous component, preferably in the amount of 10 to 40 parts by weight per 100 parts of polyolefin resin. The LLDPE resin may comprise a copolymer of ethylene with at least one alpha-olefin having 4 to 12 carbon atoms, and having a density less than 0.94.

6 Claims, 3 Drawing Figures

THERMOPLASTIC CARRYING BAG WITH BINARY POLYOLEFIN RESIN BLEND

BACKGROUND OF THE INVENTION

1. Field of the Invention

This invention relates to thermoplastic carrying bags, commonly used as grocery sacks, shopping bags, etc. In particular, it relates to an improved "undershirt" type bag made of blown tubular film comprising blended polyolefin resins for improved strength and tear resistance.

2. Description of the Prior Art

Significant advances in thermoplastic film technology have made possible low cost blown tubular film, made with various olefinic polymers, out of which packaging materials are made. Thermoplastic bags, and in particular polyethylene bags, have in recent years gained prominence in the packaging of a wide variety of goods such as grocery items, dry goods and the like. Conventional low density polyethylenes (LDPE), made by high pressure radical polymerization methods, have been commercially available for many years and have been employed in blown films and shopping bags. These LDPE resins have a high molecular weight and are highly branched. One of the most common drawbacks of the employment of such LDPE grocery bags is their tendency to rupture under load stresses and, also, their fairly low puncture resistance. One solution is to increase the film gauge, but that would lead to an increase in product costs.

Development of low pressure polymerization processes, using stereo-specific catalysts, has permitted the manufacture of linear olefin homopolymers and interpolymers. High density polyethylene (HDPE) has been economically blended with LDPE to obtain advantageous film materials having a good balance of physical properties. The HDPE copolymers have a density greater than 0.94 and are commercially available as ethylene-alpha-olefin copolymers such as ethylene-octene or ethylene-hexene.

SUMMARY OF THE INVENTION

In accordance with the present invention, it has been found that blended polyolefin resins containing linear low density polyethylene copolymers (LLDPE) are advantageous in the manufacture of thermoplastic films and bags. The blended polyolefin resins are particularly well suited for making seamless-wall handled strap bags from thin tubular film consisting essentially of a homogeneous binary blend of resins. The improved resin blend system employed in this invention contains a predominant amount of LDPE. This component is well known for thermoplastic undershirt-type handled carrying bags and is made by high pressure free-radical polymerization techniques to produce a highly-branched essentially homopolymeric macromolecular structure. Such LDPE resins have a density of less than 0.93 g/cc, preferably 0.915 to 0.925.

A minor amount of LLDPE constitutes the other resinous component, usually in the amount of 10 to 40 parts by weight per 100 parts of polyolefin resin. The LLDPE resin may comprise a copolymer of ethylene with at least one alpha-olefin having 4 to 12 carbon atoms. The amount of LLDPE is effective to increase film elongation at break and impart improved strength, impact resistance and tear properties. At least 10% LLDPE is required to obtain substantial benefit; however, a relatively small amount of this component can permit use of thinner gauge monolayer film for heat-sealed polyolefin bags. Advantageously, the blend contains about 10 to 40 wt. % LLDPE and 60 to 90 wt % ordinary branched LDPE.

Superior physical properties of blown film from this blend permits the fabrication of economical carrying bags from thinner films, resulting in substantial material savings. These and other features and advantages of the invention will be seen in the following description of the preferred embodiments.

DESCRIPTION OF SPECIFIC EMBODIMENTS

Figure 1:
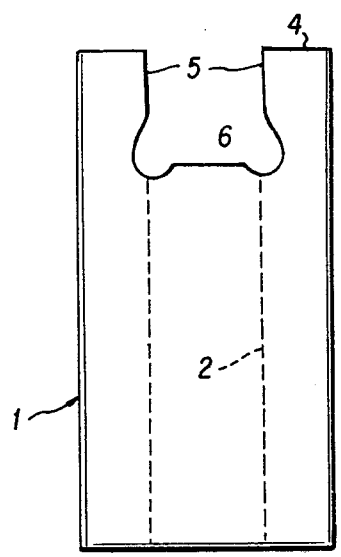
FIG. 1 is a front elevation view of one form of the bag structures of the present invention.
Figure 2:
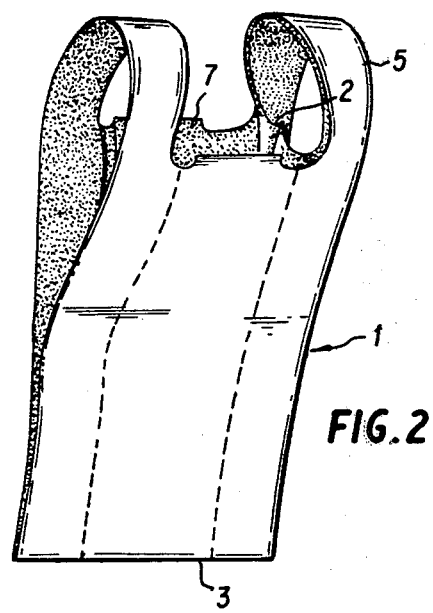
FIG. 2 is a perspective view of the bag illustrated in FIG. 1 in a partially open position.
Figure 3:
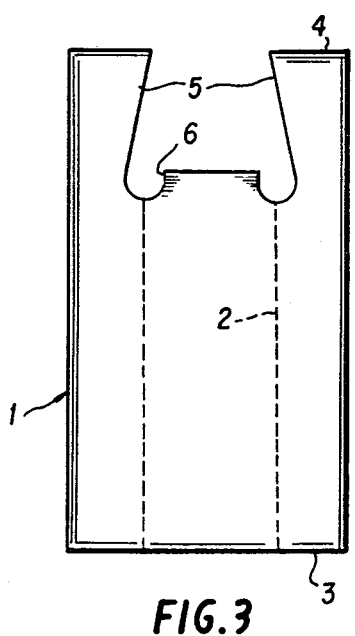
FIG. 3 is a front elevation view of another form of bags made according to the present invention.

In FIGS. 1 to 3, typical handled carrying bag constructions 1 are shown. A blown tubular monolayer film is folded to form side pleats 2.

A transverse heat seal forms the bottom 3, and top seals 4 at each side in the pleated portion forms a pair of handles 5. A cutout portion 6 between the handles provides a bag mouth portion 7.

U.S. Pat. No. 3,867,083 (Herrington) describes the method and apparatus for preparing a continuous, seamless blown thermoplastic film tubing by extruding a melt of the thermoplastic through an annular orifice into a seamless cylindrical shape, inflating the film tube thus formed and cooling such inflated tubing. A typical undershirt bag structure is disclosed in U.S. Pat. No. 4,165,832 to Kuklies et al. The disclosure relates to thermoplastic bag structures which are characterized by having a pair of carrying handles which are formed integrally with the bag walls and extended upwardly from the open mouth portion of the bag. U.S. Pat. No. 4,062,170 to Orem, discloses an apparatus for dispensing such plastic handle bearing bags from a stack of bags and holding the dispensed bag in an open position for loading. These patents show the production and use of the present invention and are herein incorporated by reference.

Numerous techniques have been described in the prior art for the formation of thermoplastic polyolefin bags. In order to obtain the improvements in physical properties such as improved strength and tear resistance which are essential to a shopping bag, much of the prior art teaches the formation of multilayer laminar thermoplastic film. In bag construction, certain particularly desirable physical characteristics should be exhibited. The bag should have a relatively high tensile modulus and resistance to impact forces. It should also exhibit good elongation under stress with a high degree of tear resistance. These improved physical characteristics are achieved in this invention in a bag made of a single layer film.

In this description parts by weight and metric units are employed unless otherwise stated. The term "density" is used in ordinary metric fashion, equated to specific gravity or grams per cubic centimeter (g/cc).

The "undershirt" bag is made from an improved thermoplastic polyolefin film consisting essentially of a binary blend of about a major amount (e.g. 60 to 90 wt.

%) of LDPE and a minor amount (e.g. 10 to 40 wt. %) of LLDPE.

The low density polyethylene (LDPE) is made by the conventional high pressure method and thus is highly branched. Advantageously, the LDPE has a density not greater than 0.93 and a fractional melt index range of 0.5 to 0.9, with a preferred melt index of 0.7. The preferred LDPE concentration is about 80 wt. %. The LDPE lends its favorable processing properties, which are advantageous for heat sealing. It also possesses excellent toughness, impact strength and tear strength. A suitable LDPE is made by Dow Chemical under the name "Resin 682". Low density polyethylene "Resin 682" has a melt index of 0.7 and a density of 0.921. Other suitable materials include Dow 122 and a $CaCO_3$-containing resin (Dow 123).

The linear low density polyethylene resins (LLDPE) are produced by newer low pressure methods, thus having less branching and more controlled molecular structure than the conventional high pressure LDPE resins. The LLDPE is a copolymer of polyethylene and at least one alpha-olefin, where said alpha-olefins have 4 to 12 carbon atoms. The preferred alpha-olefins are those with 4 to 8 carbon atoms such as butene-1, hexene-1, 4-methyl pentene, octene-1 and mixtures thereof. The LLDPE resins employed herein have a density not greater than 0.940, and preferably have a melt index range of 0.2 to 2. The preferred concentration of LLDPE in the bag blend is about 20 wt. %. Films made with LLDPE resins have significantly higher impact, tear, and tensile strength. Because of the improved physical properties, the film fabricator can either fabricate film having superior properties to conventional LDPE/HDPE blends, or can reduce film thickness to achieve comparable or even still superior film properties thus attaining significant savings in resin cost.

Suitable LLDPE resins are Dow Chemical's "Dowlex 2045", which has a density of 0.920 and a melt index value of 1.0. Other commercially available resins such as Union Carbide GP-2 and Dowlex 2038 are useful, as are the Dow XO-61500 series of experimental resins. For example, Dow's XO-61500 LLDPE resin has a density of 0.934 and a melt index value of 1.0. These resins add to the tear strength, stiffness, and toughness of the bag.

EXAMPLES

Several blend formulations were tested against a control formulation containing no LLDPE. In all the formulations, including the control, the LDPE used is Dow's "Resin 682" LDPE. "Dowlex 2045" and "Dowlex 2038", made by Dow Chemical Co., are used as the LLDPE components. Several bags with different nominal gauge films were made of each formulation according to Table 1.

TABLE 1

| Example No. | Gauge (mils) | Composition* |
|---|---|---|
| 0 | 1.50 | Control |
| 1 | 1.25 | 10% HD |
| 2 | 1.125 | duPont F7810 |
| 3 | 1.0 | |
| 4 | 1.25 | 20% LLDPE |
| 5 | 1.125 | Dowlex 2045 |
| 6 | 1.0 | |
| 7 | 1.25 | 30% LLDPE |
| 8 | 1.125 | Dowlex 2045 |
| 9 | 1.0 | |
| 10 | 1.25 | 20% LLDPE |
| 11 | 1.125 | Dowlex 2038 |
| 12 | 1.0 | |
| 13 | 1.25 | 30% LLDPE |
| 14 | 1.125 | Dowlex 2038 |
| 15 | 1.0 | |

*All have masterbatch, which contains 50% pigment and 50% LLDPE. Remainder of composition is LDPE.

500 Bags of each of the different grocery sacks were subjected to stardardized simulation testing. This entailed the packaging of groceries into sacks making use of the dispenser system, and the transporting of those loaded grocery sacks by auto and by foot. An analysis of each bag was conducted as part of the work.

Historical data indicates that 75% of all customers transport groceries by automobile with the remaining 25% making their shopping trips on foot. Thus, the simulation assured this 75:25 ratio. Auto trips included carting a six (6) bag order to the car, driving a total of five miles and then noting any pertinent data about the bags. Walking trips included carrying a two (2) bag order for 150 yards and again noting pertinent bag data, studies of loaded bag weights indicate the average bag weighs 13-15 pounds; the simulation incorporated this data. Boxes were replaced frequently to maintain "sharp" corners representative of a normal environment during the bag usage.

Punctures are defined as rounded holes caused by cans and/or box corners. Can typically cause a puncture during loading, unloading, and/or bag placement in the auto; punctures from box corners are typically induced during the carrying phase. Tears/splits are defined as elongated holes and are most often induced by box corners during the loading operation.

Results of the simulation tests are summarized in Tables 2 and 3. The results clearly show the ability to reduce film gauge when linear low density polyethylene is used. With the addition of this component (LLDPE) one can make stronger thinner bags. Table 4 summarizes the properties of the bag films. The bags with LLDPE show improved elongation and better balanced properties than the ones without.

TABLE 2

| | 15 Pound Load | | | | | | | | | | |
|---|---|---|---|---|---|---|---|---|---|---|---|
| | Example No. | | | | | | | | | | |
| | Control | 1 | 3 | 4 | 6 | 7 | 9 | 10 | 12 | 13 | 15 |
| | 1.50 | 1.25 | 1.0 | 1.25 | 1.0 | 1.25 | 1.0 | 1.25 | 1.0 | 1.25 | 1.0 |
| | 10% HD | 10% HD | 10% HD | 20% LLD | 20% LLD | 30% LLD | 30% LLD | 20% LLD | 20% LLD | 30% LLD | 30% LLD |
| Number of Trips | | | | | | | | | | | |
| Walk | 55 | 62 | 66 | 62 | 63 | 59 | 54 | 62 | 61 | 40 | 56 |
| Drive | 62 | 61 | 54 | 60 | 60 | 60 | 61 | 60 | 62 | 47 | 58 |
| Total | 117 | 123 | 120 | 122 | 123 | 119 | 115 | 122 | 123 | 87 | 114 |
| Number of Bags | | | | | | | | | | | |
| Walk | 110 | 124 | 132 | 124 | 126 | 118 | 108 | 124 | 122 | 80 | 112 |
| Drive | 372 | 366 | 324 | 360 | 360 | 360 | 366 | 360 | 372 | 282 | 348 |

TABLE 2-continued

15 Pound Load

| | Control 1.50 10% HD | 1 1.25 10% HD | 3 1.0 10% HD | 4 1.25 20% LLD | 6 1.0 20% LLD | 7 1.25 30% LLD | 9 1.0 30% LLD | 10 1.25 20% LLD | 12 1.0 20% LLD | 13 1.25 30% LLD | 15 1.0 30% LLD |
|---|---|---|---|---|---|---|---|---|---|---|---|
| Total % of Incidence | 482 | 490 | 456 | 484 | 486 | 478 | 474 | 484 | 494 | 362 | 460 |
| Tears/Splits | 16 | 13 | 23 | 9 | 16 | 11 | 11 | 9 | 12 | 15 | 14 |
| Punctures | 46 | 42 | 26 | 31 | 37 | 27 | 37 | 31 | 46 | 44 | 46 |

TABLE 3

23 Pound Load

| | Example No. | | | | | | | | | |
|---|---|---|---|---|---|---|---|---|---|---|
| | 0 | 1 | 3 | 4 | 6 | 7 | 9 | 10 | 12 | 13 | 15 |
| Number of Trips | | | | | | | | | | | |
| Walk | 3 | 4 | 4 | 3 | 5 | 4 | 5 | 4 | 4 | 4 | 4 |
| Drive | 2 | 3 | 3 | 4 | 4 | 4 | 5 | 4 | 4 | 4 | 4 |
| Total | 5 | 7 | 7 | 7 | 9 | 8 | 10 | 8 | 8 | 8 | 8 |
| Total Number of Bags | | | | | | | | | | | |
| Walk | 6 | 8 | 8 | 6 | 10 | 8 | 10 | 8 | 8 | 8 | 8 |
| Drive | 12 | 18 | 18 | 24 | 24 | 24 | 30 | 24 | 24 | 24 | 24 |
| Total | 18 | 26 | 26 | 30 | 34 | 32 | 40 | 32 | 32 | 32 | 32 |
| % of Incidence | | | | | | | | | | | |
| Tears/splits | 44 | 23 | 31 | 10 | 9 | 25 | 29 | 9 | 16 | 31 | 25 |
| Punctures | 56 | 81 | 115 | 43 | 24 | 53 | 43 | 38 | 50 | 56 | 50 |
| Bottom Seal Failure | — | — | 4 | — | 5 | — | — | — | — | — | — |
| Handle Failure | — | — | 3 | — | — | — | — | — | — | — | — |

EXAMPLES 16 TO 27

Blown 40 u (1.75 mil) thick film was made by melt extruding (490° F. a blend of a Dowlex 2038 or 2045 LLDPE copolymer with Dow Resin 123 on Dow Resin 682 as the branched ethylene homopolymer. The film was extruded from a 2.5 inch diameter slit ring orifice die, having a die gap of 0.040 inch. An imposed shape cooling technique was used to force ambient air (72° F.) against the blower film, which has a blow up ratio of about 2:1. The extrusion speed was 154 ft/min., with a nip roll speed of 300 to 500 ft/min. The data in Table 5 show the film properties, as compared with a control film of 10% HDPE copolymer with 90% LDPE.

It was found that a superior film could be obtained with the LLDPE/LDPE blend, having increased yield stress, ultimate tensile strength and elongation, compared with straight 100% LDPE base film by increasing the copolymer to 20 to 30 wt. %. When such large

TABLE 5

| Ex. No. | LLDPE Wt. % | LDPE wt. % | Tensile Properties % | | | Elmendorf Tear (MD) (grams) |
|---|---|---|---|---|---|---|
| | | | Yield (psi) | Ultimate (psi) | Elongation (%) | |
| 16 | 10% Dow 2038 | 90% Dow* 123 | 1314 | 3714 | 312 | 106 |
| 17 | 20% Dow 2038 | 80% Dow* 123 | 1600 | 3886 | 344 | 135 |
| 18 | 30% Dow 2038 | 70% Dow* 123 | 1600 | 4343 | 414 | 82 |
| 19 | HDPE CONTROL | 90% Dow* 123 | 1486 | 4057 | 326 | 99 |
| 20 | 10% Dow 2045 | 90% Dow* 123 | 1257 | 3829 | 361 | 104 |
| 21 | 20% Dow 2045 | 80% Dow* 123 | 1257 | 4000 | 403 | 107 |
| 22 | 10% Dow 2038 | 90% Dow 682 | 1429 | 4057 | 435 | 146 |
| 23 | 20% Dow 2038 | 80% Dow 682 | 1600 | 4343 | 440 | 131 |
| 24 | 30% Dow 2038 | 70% Dow 682 | 1771 | 4514 | 455 | 112 |
| 25 | HDPE CONTROL | 90% Dow 682 | 1429 | 4171 | 410 | 132 |
| 26 | 10% Dow 2045 | 90% Dow 682 | 1486 | 4114 | 400 | 140 |
| 27 | 20% Dow 2045 | 80% Dow 682 | 1429 | 4286 | 450 | 124 |

*Contains 2000 ppm $CaCO_3$

TABLE 4

| | | Example No. | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Caliper (mils) | | 1.46 | 1.19 | 1.08 | 1.00 | 1.25 | 1.16 | 1.07 | 1.23 | 1.16 | 1.01 | 1.26 | 1.17 | 1.01 | 1.27 | 1.10 | .99 |
| yield (psi) | MD | 1210 | 1238 | 1130 | 1079 | 1033 | 1000 | 1020 | 1082 | 1105 | 1182 | 1443 | 1222 | 1144 | 1160 | 1130 | 1131 |
| | TD | 1506 | 1579 | 1585 | 1582 | 1377 | 1459 | 1458 | 1385 | 1380 | 1387 | 1689 | 1614 | 1596 | 1678 | 1607 | 1781 |
| (p/x) | MD | 1.84 | 1.56 | 1.32 | 1.09 | 1.25 | 1.09 | 1.03 | 1.32 | 1.16 | 1.17 | 1.76 | 1.48 | 1.19 | 1.46 | 1.22 | 1.21 |
| | TD | 2.38 | 1.99 | 1.68 | 1.65 | 1.68 | 1.62 | 1.40 | 1.69 | 1.49 | 1.47 | 2.01 | 1.84 | 1.66 | 1.98 | 1.80 | 1.71 |
| ultimate (psi) | MD | 4118 | 4460 | 4638 | 4673 | 4273 | 4130 | 4317 | 4467 | 4800 | 4616 | 4404 | 4231 | 4135 | 4288 | 4556 | 4467 |
| | TD | 2228 | 2119 | 2226 | 2163 | 2418 | 2232 | 2292 | 2377 | 2546 | 2208 | 2462 | 2465 | 2269 | 2593 | 2482 | 2354 |
| (p/x) | MD | 6.26 | 5.63 | 5.38 | 4.72 | 5.17 | 4.51 | 4.36 | 5.45 | 5.04 | 4.57 | 5.47 | 4.95 | 4.30 | 5.36 | 4.92 | 4.78 |
| | TD | 3.52 | 2.67 | 2.36 | 2.12 | 2.95 | 2.48 | 2.20 | 2.90 | 2.75 | 2.34 | 2.93 | 2.81 | 2.36 | 3.06 | 2.78 | 2.26 |
| Elongation (%) | MD | 292 | 218 | 183 | 126 | 240 | 212 | 180 | 298 | 280 | 238 | 270 | 200 | 184 | 280 | 246 | 192 |
| | TD | 600 | 527 | 500 | 502 | 570 | 530 | 528 | 596 | 604 | 532 | 600 | 596 | 592 | 592 | 588 | 584 |
| Modulus (psi) | MD | 2.61 | 2.84 | 2.80 | 2.78 | 2.47 | 2.71 | 2.68 | 2.43 | 2.43 | 2.65 | 3.13 | 2.81 | 3.17 | 3.12 | 3.37 | 3.30 |
| X10$^4$ | TD | 3.12 | 3.81 | 3.90 | 3.03 | 2.87 | 3.10 | 3.06 | 2.80 | 2.72 | 3.37 | 4.06 | 3.75 | 3.91 | 3.82 | 4.11 | 4.55 |
| ELMENDORF | MD | 103 | 148 | 131 | 130 | 98 | 64 | 79 | 46 | 30 | 31 | 59 | 122 | 146 | 235 | 64 | 85 |
| (gm/mil) | TD | 190 | 232 | 205 | 190 | 198 | 193 | 196 | 231 | 253 | 304 | 286 | 225 | 217 | 290 | 332 | 313 |
| GMS | MD | 157 | 182 | 144 | 144 | 121 | 74 | 80 | 50 | 45 | 32 | 74 | 141 | 150 | 294 | 77 | 80 |
| | TD | 298 | 285 | 230 | 198 | 23 | 224 | 198 | 294 | 294 | 304 | 350 | 266 | 224 | 365 | 285 | 326 | amounts of HDPE copolymer are used, film splittiness gives inferior carrying bag properties.

EXAMPLES 37 AND 38

A melt extruded blown film was made under conditions similar to the above examples, except that the blend consisted of 20 wt. % Dowlex 2038 LLDPE, 7% white pigmented master batch containing equal parts of $TiO_2$ and LDPE, and 73% Northern 941 LDPE resin. The line speed was adjusted to yield a film thickness of about 32 u (1.3 mil) and 35 u (1.6 mil) respectively, with cooled air ring imposed shape blowing. The control is substantially identical except that the copolymer is DuPont F7810 HDPE. The film properties are tabulated below in Tables 6 through 8.

TABLE 6

| Sample No. | Average Caliper, Mils | Average Total Energy, in-lb | in-lb/mil |
|---|---|---|---|
| 28 | 1.263 | 15.53 | 10.89 |
| 29 | 1.657 | 19.89 | 11.32 |
| CONTROL | 1.454 | 19.35 | 12.90 |
| CONTROL | 1.721 | 23.37 | 13.46 |

TABLE 7

| Sample No. | | Caliper, Mils | | | Tear Length cm | | | Tear Resistance, lb | | |
|---|---|---|---|---|---|---|---|---|---|---|
| | | High | Low | Avg. | High | Low | Avg. | High | Low | Avg. |
| 28 | MD | 1.45 | 1.30 | 1.39 | 6.85 | 5.65 | 6.05 | 6.58 | 5.79 | 6.28 |
| | TD | 1.50 | 1.25 | 1.37 | 4.35 | 3.55 | 3.80 | 9.23 | 7.92 | 8.76 |
| 29 | MD | 1.85 | 1.65 | 1.76 | 5.60 | 4.25 | 4.88 | 8.06 | 6.62 | 7.29 |
| | TD | 1.80 | 1.60 | 1.71 | 3.65 | 3.05 | 3.34 | 10.41 | 9.04 | 9.68 |
| CONTROL | MD | 1.55 | 1.35 | 1.48 | 6.60 | 5.35 | 6.02 | 6.83 | 5.93 | 6.30 |
| | TD | 1.65 | 1.35 | 1.49 | 3.70 | 3.45 | 3.52 | 9.44 | 8.94 | 9.30 |
| CONTROL | MD | 1.85 | 1.60 | 1.74 | 5.80 | 4.90 | 5.38 | 7.26 | 6.46 | 6.80 |
| | TD | 1.80 | 1.65 | 1.72 | 3.35 | 2.95 | 3.11 | 10.69 | 9.66 | 10.26 |

TABLE 8

| Example No. | Caliper, mils | Elastic Modulus, psi | | Stiffness, lb/in | | Tensile Yield, psi | | Tensile Ultimate, psi | | Tensile Toughness, ft-lb/in$^3$ | | Elongation, % | | Elmendorf Tear, gm/mil. | | Film Density, gm/cc |
|---|---|---|---|---|---|---|---|---|---|---|---|---|---|---|---|---|
| | | MD | TD | MD | TD | MD | TD | MD | TD | MD | TD | MD | TD | MD | TD | |
| 28 | 1.463 | 43546 | 58995 | 59.8 | 79.4 | 1467 | 1553 | 3997 | 3198 | 836 | 1275 | 309 | 768 | 38 | 166 | .9528 |
| 29 | 1.765 | 39372 | 51940 | 66.3 | 87.7 | 1440 | 1578 | 3733 | 3168 | 995 | 1287 | 406 | 778 | 35 | 170 | .9513 |
| CONTROL | 1.421 | 45325 | 65045 | 63.4 | 90.4 | 1512 | 1733 | 4109 | 3107 | 940 | 1345 | 339 | 787 | 12 | 373 | .9492 |
| CONTROL | 1.656 | 44768 | 64448 | 74.0 | 107.0 | 1526 | 1678 | 4086 | 3038 | 1099 | 1301 | 412 | 777 | 15 | 345 | .9469 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. An undershirt-type handle strap carrying bag formed of a thin polyolefin film consisting of a homogeneous binary blend of hydrocarbon resins, said resin blend containing:
   a. 10 to 40 wt. % linear low density copolymer of ethylene with 1 to 10 wt. % alpha-olefin having 4 to 8 carbon atoms, and having a melt index of 0.2 to 2; and
   b. 60 to 90 wt. % highly branched low density ethylene homopolymer having a fractional melt index of 0.5 to 0.9.

2. The bag of claim 1 wherein said hydrocarbon resin blend contains about 20 wt. % linear low density copolymer having a specific gravity 0.915 to 0.94 and about 80 wt. % branched low density homopolymer.

3. The bag of claim 1 wherein the bag is constructed of single layer uniformly thick film.

4. The bag of claim 1 wherein said film has an average gauge of about 1.75 mils or less.

5. In a thermoplastic polyolefin bag wherein a uniform tubular film is folded to form side pleats, heat sealed to form a transverse bottom portion and sealed at opposing portions adjacent to a central cutout to form a pair of integral handles, an improved polyolefin binary blend film consisting essentially of:

60 to 90 weight % of a highly branched polyethylene having a density less than 0.930 g/cc and a fractional melt index range of from about 0.5–0.9; and
10 to 40 weight % of a linear low density copolymer of ethylene with from about 1 to 10 weight % of an alpha olefin of 4 to 12 carbon atoms having a density less than about 0.940 g/cc and a melt index of from about 0.2 to 2.

6. The bag of claim 5 wherein said film has an average gauge of about 1.75 mils or less.

* * * * *